(12) United States Patent
Corbaton et al.

(10) Patent No.: US 7,106,792 B2
(45) Date of Patent: Sep. 12, 2006

(54) METHOD AND APPARATUS FOR ESTIMATING THE SIGNAL TO INTERFERENCE-PLUS-NOISE RATIO OF A WIRELESS CHANNEL

(75) Inventors: Ivan Jesus Fernandez Corbaton, San Diego, CA (US); John E. Smee, San Diego, CA (US); Srikant Jayaraman, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 746 days.

(21) Appl. No.: 09/873,892

(22) Filed: Jun. 4, 2001

(65) Prior Publication Data

US 2002/0186761 A1 Dec. 12, 2002

(51) Int. Cl.
*H03H 7/30* (2006.01)
*H03K 5/159* (2006.01)
(52) U.S. Cl. ...................... 375/232; 375/231
(58) Field of Classification Search ........ 375/229–232, 375/316, 340–341, 346, 348, 147
See application file for complete search history.

(56) References Cited

U.S. PATENT DOCUMENTS

| | | | |
|---|---|---|---|
| 4,901,307 A | 2/1990 | Gilhousen et al. | |
| 4,991,184 A | 2/1991 | Hashimoto | 375/8 |
| 5,103,459 A | 4/1992 | Gilhousen et al. | |
| 5,504,773 A | 4/1996 | Padovani et al. | |
| 5,914,959 A * | 6/1999 | Marchetto et al. | 370/468 |
| 6,175,588 B1 * | 1/2001 | Visotsky et al. | 375/148 |
| 6,215,818 B1 | 4/2001 | Velez et al. | 375/233 |
| 6,310,915 B1 * | 10/2001 | Wells et al. | 375/240.03 |
| 6,628,707 B1 * | 9/2003 | Rafie et al. | 375/233 |
| 6,680,985 B1 * | 1/2004 | Strodtbeck et al. | 375/320 |

FOREIGN PATENT DOCUMENTS

EP 0366159 5/1990

OTHER PUBLICATIONS

Cioffi, et al. "MMSE Decision-Feedback Equalizers and Coding-Part I: Equalization Results" IEEE Transactions on Communications 43(10): 2582-2594 (1995).

* cited by examiner

*Primary Examiner*—Kevin Burd
(74) *Attorney, Agent, or Firm*—Philip Wadsworth; Sandra L. Godsey; Thomas R. Rouse

(57) ABSTRACT

Method and apparatus that compensates for overestimation of channel SINR due to overfitting of an adaptive equalizer to the pilot portion of a received frame. The SINR of a wireless channel is estimated by adapting an adaptive equalizer using the pilot portion of the frame, applying the adaptive equalizer to a non-pilot portion of the frame, determining a parameter using the adaptive equalizer output, and estimating the SINR of the wireless channel using the parameter. The parameter can include, for example, the mean square error (MSE) or the bias of the equalizer output. The accuracy of the SINR estimate according to this aspect of the present invention is thereby improved (as compared to a SINR estimate based on parameters calculated during the pilot interval) because the adaptive equalizer is not overfit to the control or data portions of the frame.

18 Claims, 5 Drawing Sheets

METHOD AND APPARATUS FOR ESTIMATING THE SIGNAL TO INTERFERENCE-PLUS-NOISE RATIO OF A WIRELESS CHANNEL

BACKGROUND

1. Field

The present invention relates generally to communications, and more specifically to estimating the signal to interference-plus-noise ratio (SINR) of a wireless channel.

2. Background

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System", hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein. The "TIA/EIA/IS-2000 Standard" describes a next generation cdma2000 multi-carrier 1X and 3X air interface specification, hereinafter referred to as the cdma2000 standard.

In the CDMA system, communications between users are conducted through one or more base stations. In this specification, a base station refers to the hardware with which user terminals communicate. A first user terminal communicates with a second user terminal by transmitting data on a reverse link to a base station. The base station receives the data and can route the data to another base station. The data is transmitted on a forward link of the same base station, or a second base station, to the second mobile station. The forward link refers to transmission from the base station to a user terminal and the reverse link refers to transmission from the user terminal to a base station. In IS-95 systems, the forward link and the reverse link are allocated separate frequencies.

Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. Further, a high data rate (HDR) system that provides for high rate packet data transmission in a CDMA system is described in detail in the "TIA/EIA/IS-856—cdma2000 High Rate Packet Data Air Interface Specification" (hereinafter referred to as the HDR standard), as well as U.S. Pat. No. 6,574,211, entitled "METHOD AND APPARATUS FOR HIGH RATE PACKET DATA TRANSMISSION", issued Jun. 3, 2003, assigned to the assignee of the present invention and incorporated by reference herein.

According to these HDR systems, user terminals transmit a data rate control (DRC) message to the base station. The DRC value corresponds to the rate at which the user terminal expects to receive data on the forward link. The DRC value depends, at least in part, on the signal to interference-plus-noise ratio (SINR) of the user terminal's channel. Less noisy channels can support higher data rates. The DRC value should therefore be decreased as the channel SINR decreases, or increased as the channel SINR increases. DRC values should be set as high as possible if data throughput in the system is to be maximized. However, accurately setting the DRC value depends upon achieving a reliable estimate of the channel SINR. Overestimating the channel SINR can result in a data rate that results in an unexpectedly high occurrence of errors at the user terminal.

An adaptive equalizer can be used in the user terminal's receiver to suppress interference and improve system performance. The filter coefficients of the adaptive equalizer can be adapted (referred to herein simply as adapting the adaptive equalizer) during the pilot portion of a particular frame. As used herein, describing the adaptive equalizer as being adapted or applied "during" a particular portion of a frame refers to adapting or applying the equalizer to the symbols within that portion of the frame, though the symbols need not necessarily be processed during any particular time interval. Frames (also referred to herein as packets) transmitted in a HDR system include the pilot portion as well as one or more non-pilot portions, such as a control portion and a data portion. The pilot symbols are known a priori at the receiver. Conventional algorithms for adapting the filter coefficients to their desired values are often based on the criteria of minimizing mean square error (MMSE) between the known pilot symbols and the equalizer's estimates of these pilot symbols. Two common examples of adaptive MMSE algorithms are the least-mean-square (LMS) algorithm and the recursive-least-squares (RLS) algorithm.

Typically the known pilot symbols make up a fraction (e.g., 10%) of a frame, while control symbols and data symbols make up the remainder of the frame (e.g., 10% and 80%, respectively). Though the pilot symbols are known at the receiver, the control symbols and data symbols are a priori unknown at the receiver. In many situations (such as when the uncoded symbol error rate is high enough to prevent decision directed adaptation, or when low implementation complexity is desired) the equalizer coefficients are recursively adapted only during the pilot portion of the frame and held fixed during the non-pilot portions of the frame.

According to conventional receiver designs, the channel SINR is calculated using one or more parameters estimated during the pilot portion of a particular frame. These estimated parameters could include the mean squared error (MSE) of the equalizer's estimates of the pilot symbols, the bias in the equalizer's estimates of the pilot symbols, or some other estimates. As will be apparent to those skilled in the art, the SINR can be defined in different ways depending on a variety of assumptions made regarding the application environment. However, according to many definitions, the SINR is inversely related to the MSE.

In those instances where the equalizer's coefficients are adapted during the pilot interval alone, the difference between the pilot symbols and the equalizer's estimates of the pilot symbols will on average be smaller than the difference between the data symbols (or control symbols) and the equalizer's estimates of the data symbols (or control symbols). In other words, the MSE of the equalizer will be lower during the pilot portion than it will be during non-pilot portions. This MSE difference arises because the adaptive filter coefficients are tuned by the adaptive algorithm to minimize the MSE during the pilot portion, but are not specifically tuned to the non-pilot portions. The magnitude of the difference will depend, in part, on the extent to which the pilot portion is not statistically representative of the underlying random process that describes the non-pilot portions. This phenomenon is referred to herein as the adaptive equalizer being "overfit" to the pilot portion. The overfit is magnified when algorithms such as the multiple-pass LMS are used because with each successive pass through the same observations, the coefficients tune themselves more closely to the particular data set.

Overfitting of the adaptive equalizer affects not only the calculation of MSE, but calculation of other parameters as well, such as the bias in the adaptive equalizer's estimate. As mentioned above, these factors can be used to estimate the channel SINR. Errors in the calculation of these parameters will result in errors in the estimate of the channel SINR. This in turn can cause the receiver to select a sub-optimum DRC value. For example, receivers that calculate the MSE during the pilot interval may overestimate the channel SINR due to the equalizer being overfit to the pilot symbols. If the DRC value is selected based on this SINR estimate, the transmitter may then transmit frames at a data rate that will result in a larger number of errors than expected in the received data. This is because the quality with which a frame is received (e.g. the packet error rate (PER)) depends, at least in part, on the data rate and the channel SINR experienced during the data portion of the frame.

There is therefore a need in the art for an improved method and apparatus for estimating the SINR of a wireless channel that compensates for overfitting of an adaptive equalizer in the receiver.

SUMMARY

Embodiments disclosed herein address the above stated needs by compensating for the overestimation of channel SINR due to overfitting of an adaptive equalizer to the pilot portion of a received frame. According to an aspect of the present invention, the SINR of a wireless channel is estimated by adapting an adaptive equalizer using the pilot portion of a received frame, applying the adaptive equalizer to a non-pilot portion of the frame (such as a control or data portion), determining a parameter using the adaptive equalizer output, and estimating the SINR of the wireless channel using the parameter. The parameter can include, for example, the MSE or the bias of the equalizer output. The accuracy of the SINR estimate according to this aspect of the present invention is thereby improved (as compared to a SINR estimate based on parameters calculated during the pilot interval) because the adaptive equalizer is less likely to be overfit to the control or data portions of the frame.

According to a second aspect of the present invention, once the adaptive equalizer has adapted using the pilot portion of a received frame, the adaptive equalizer is applied to a control portion of the received frame to generate a soft estimate of control symbols. A hard decision is also applied to this soft estimate to generate a hard estimate of these control symbols. A parameter is calculated using these soft and hard estimates of the control symbols. For example, the MSE can be determined by calculating the mean of the squared difference between the soft and hard estimates. The accuracy of the SINR estimate based on the parameter will be improved because the adaptive equalizer is less likely to be overfit to the control portion.

According to a third aspect of the present invention, once the adaptive equalizer has adapted using the pilot portion of a received frame, the adaptive equalizer is applied to a data portion of the received frame where the data portion includes a plurality of encoded data bits. The output of the adaptive equalizer therefore represents a soft estimate of the encoded data bits. The receiver decodes the equalizer output to recover the un-encoded data bits, generally with a relatively high probability of success. According to this aspect of the present invention, the data bits are then re-encoded such that the re-encoded data bits are representative of the encoded data bits transmitted by the transmitter. A parameter is calculated using the soft estimate of the encoded data bits and the re-encoded data bits. For example, the MSE can be determined by calculating the mean of the squared difference between the soft estimate and the re-encoded data bits. The accuracy of the SINR estimate based on this parameter will be improved because the adaptive equalizer is less likely to be overfit to the data portion.

According to a fourth aspect of the present invention, a parameter calculated during a non-pilot portion of a frame is used to estimate a non-pilot SINR, and a second parameter calculated during a pilot portion of the frame is used to estimate a pilot SINR. An SINR compensation factor is calculated using the non-pilot SINR and pilot SINR estimates. The SINR compensation factor can be smoothed over a plurality of frames, and used to adjust the pilot SINR to compensate for the equalizer overfit. The accuracy of the SINR compensation factor estimate (and as a result, the estimate of the channel SINR) is thereby improved by smoothing the estimate over the plurality of frames.

According to a fifth aspect of the present invention, the adaptive equalizer is applied to the pilot portion of a current frame using the filter coefficients adapted during a previous frame. A parameter is calculated using the equalizer output and the known pilot symbols. This parameter is used to estimate the channel SINR. The accuracy of the SINR estimate based on this parameter will on average be improved because the adaptive equalizer was tuned to the pilot portion from a previous frame rather than the current frame, and as a result, the equalizer is less likely to be overfit to the current pilot.

DETAILED DESCRIPTION

Overview

Figure 1A:
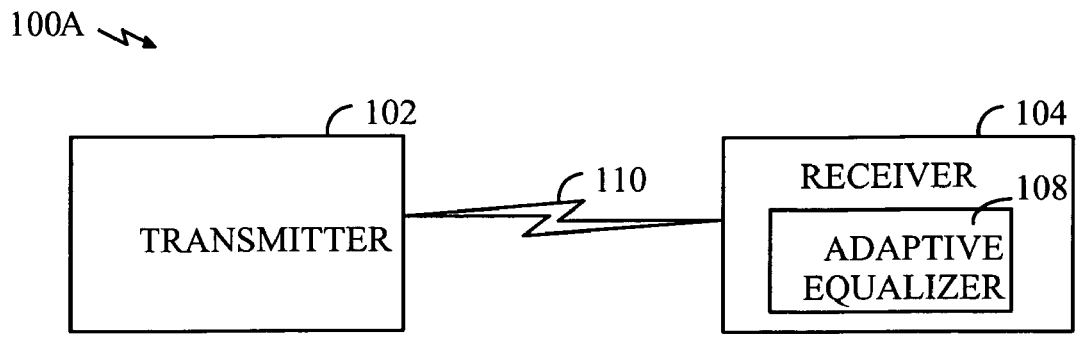
FIG. 1A depicts an example communications environment within which the present invention operates.

The present invention relates generally to estimating the SINR of a wireless channel. FIG. 1A depicts an example communications environment 100A within which the present invention can operate. Example communications environment 100A includes a transmitter 102 in communication with a receiver 104 via a wireless channel 110. Transmitter 102 can represent any device capable of transmitting information over wireless channel 110. Similarly, receiver 104 can represent any device capable of receiving information over wireless channel 110. Receiver 104 includes an adaptive equalizer 108 for suppressing the effects of noise and interference introduced by wireless channel 110. Wireless channel 110 can represent any wireless link over which information can flow according to a defined communication protocol. According to example embodiments of the present invention, communications over wireless channel 110 can conform to the IS-95 CDMA standard, the cdma2000 standard, and/or the HDR standard.

Figure 1B:
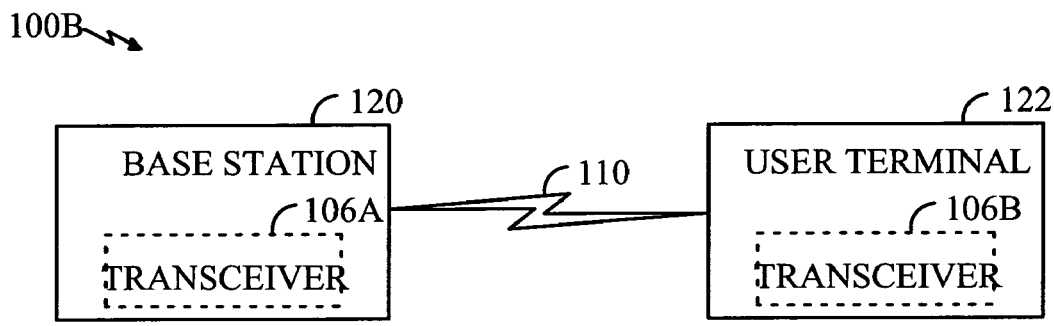
FIG. 1B depicts a mobile communication environment that includes a base station in communication with a user terminal via a wireless channel.

Receiver 104 may be configured to estimate the SINR of wireless channel 110 according to example embodiments of the present invention contemplated by the description herein. As will be apparent, receivers so configured may find application in many different environments. For example, FIG. 1B depicts a mobile communication environment 100B that includes a base station 120 in communication with a user terminal 122 via wireless channel 110. Wireless channel 110 in this example environment can represent the forward and/or reverse link. Base station 120 and user terminal 122 both include a transceiver 106 (shown as 106A in base station 120, and 106B in user terminal 122) for full-duplex communication, wherein transceiver 106 includes both transmitter and receiver sections. Both transceivers 106 may therefore be configured in relevant part as described with respect to receiver 104, though the following description focuses more on applications for the forward link wherein the receiver section in user terminal 122 is configured as described herein.

Receiver 104 may be configured to perform the operations described herein in hardware, software, or a combination of both. These operations are described herein and illustrated in the appended flowcharts. It will be apparent to those of skill in the art that many of these operations can be interchanged without departing from the scope of the invention. It will also be apparent that there could be many different ways of implementing the invention in computer programming, whether software or a combination of hardware and software, and the invention should not be construed as limited to any one set of computer program instructions. Further, a skilled programmer would be able to write one or more computer programs to implement the disclosed invention without difficulty based on the flowcharts and associated written description included herein. Therefore, disclosure of a particular set of program code instructions is not considered necessary for an adequate understanding of how to make and use the invention. The inventive functionality of the claimed computer programs and/or hardware devices will be explained in more detail in the following description in conjunction with the remaining figures illustrating the program flow.

Adaptive equalizer 108 represents a time-varying filter structure having a plurality of filter coefficients (not shown). As will be apparent to those skilled in the art, adaptive equalizer 108 can be implemented as hardware, software, or a combination of both. As will also be apparent, various adaptive algorithms can be used to select the filter coefficients, such as the LMS algorithm and the RLS algorithm. The various example embodiments of the present invention described herein are independent of the particular structure or adaptation algorithm chosen for adaptive equalizer 108.

Figure 1C:
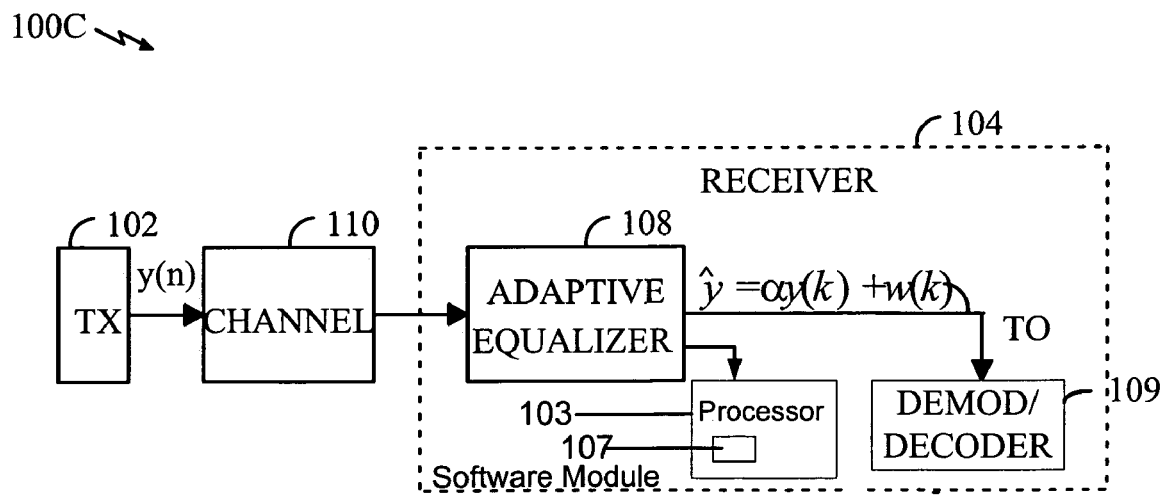
FIG. 1C depicts a wireless receiver in greater detail according to an example embodiment of the present invention.

FIG. 1C depicts receiver 104 in greater detail according to an example embodiment of the present invention. Receiver 104 includes a processor 103 comprising a software module 107. The software module 107 includes instructions which embody the steps disclosed in FIGS. 3–7. As shown in FIG. 1C, a sequence of digital data y(n) is transmitted through wireless channel 110 and is corrupted by additive noise and possibly interference. The following model describes the output of adaptive equalizer 108:

$$\hat{y}(k) = \alpha y(k) + w(k),$$

where $\alpha$ is the bias in the estimate of y(k) and w(k) represents all additive disturbances introduced by wireless channel 110. As will be apparent to those skilled in the art, this model is valid under certain conditions. The model applies particularly well when the equalizer's adaptive algorithm is in steady state, and in the proximity of the optimal solution for the filter coefficients. In practice, $E\{\|y(k)\|^2\} = \sigma_y^2$ is known since we know the average power of the transmitted constellation.

Figure 2:
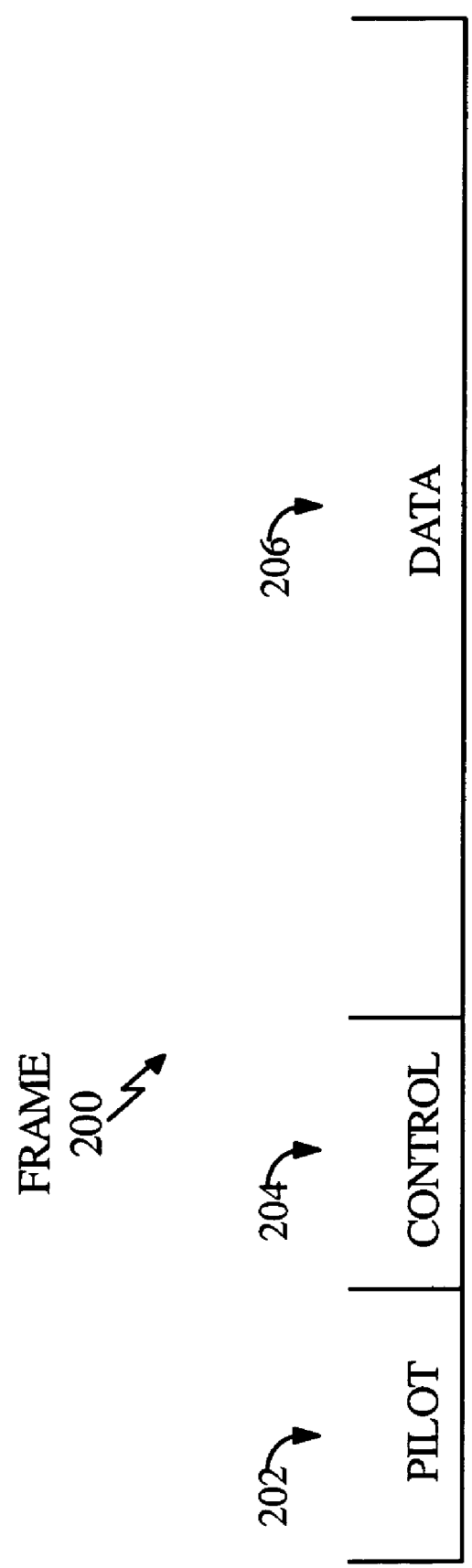
FIG. 2 depicts an example frame having a pilot portion and two non-pilot portions (a control portion and a data portion)

According to an example embodiment of the present invention, transmitter 102 and receiver 104 exchange information via wireless channel 110 using data frames. FIG. 2 depicts an example frame 200 having a pilot portion 202 and two non-pilot portions: a control portion 204 and a data portion 206. Pilot portion 202 includes pilot symbols that are a priori known to receiver 104. These pilot symbols are used by adaptive equalizer 108 to adapt the filter coefficients so that noise and interference introduced by wireless channel 110 are cancelled. Control portion 204 includes control symbols that are used to trigger various control functions within receiver 104.

Data portion 206 includes data bits that, depending upon the particular application, can be encoded using a channel coding technique. Digital communication systems often employ channel coding to lower the probability of bit error or packet error. As shown in FIG. 1C, in systems with channel coding the data symbol estimates (i.e., the equalizer output during the data period) are passed to a demodulator and decoder to detect the data bits. Further, receiver 104 can ascertain with a high degree of confidence whether a frame was received without error by performing a cyclic-redundancy check (CRC) of the detected bits. Various techniques for channel coding and performing CRCs are well known in the relevant art.

Figure 3:
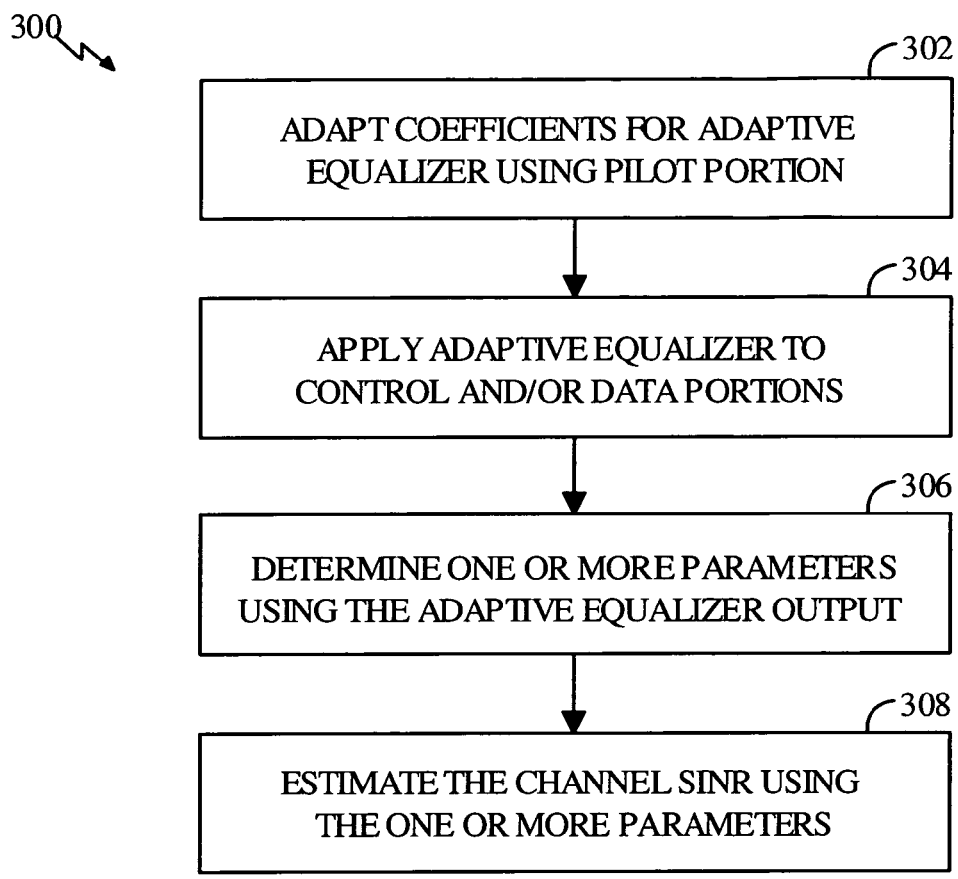
FIG. 3 is a flowchart that describes a method according to an example embodiment of the present invention for estimating the SINR of a wireless channel.

FIG. 3 is a flowchart 300 that describes a method according to an example embodiment of the present invention for estimating the SINR of wireless channel 110. In operation 302, adaptive equalizer 108 is adapted using pilot portion 202 of the current frame. As mentioned above, various algorithms (such as the LMS and RLS algorithms) are known in the relevant art for adjusting the filter coefficients of adaptive equalizer 108 such that the received data is demodulated, and noise and interference is suppressed. As will be apparent, adaptive equalizer 108 uses the a priori known values of the pilot symbols to, for example in the case of the LMS and RLS algorithms, adapt the coefficients in such a way so as to minimize the MSE between the equalizer output and the known values.

In operation 304, adaptive equalizer 108 is applied to a non-pilot portion of the frame, such as control portion 204 or data portion 206. The equalizer output represents a soft estimate of the symbols included within the portion to which the equalizer is applied. Adaptive equalizer 108 is less likely to be overfit to the non-pilot portions of the frame since the filter coefficients were adapted using pilot portion 202 rather than the non-pilot portions.

In operation 306, one or more parameters are determined using the output of the adaptive equalizer in operation 304. These parameters, either alone or in combination, are used to determine an estimate of the SINR of wireless channel 110. According to a first example embodiment, the MSE of the equalizer output during the non-pilot portion is used as a parameter for calculating SINR. One example formulation for MSE is given by:

$$M\hat{S}E = E\{\|y(k) - \hat{y}(k)\|^2\} = \frac{\sum_{k,\text{pilot\_symbols}} |y(k) - \hat{y}(k)|^2}{\text{Number\_of\_pilot\_symbols}}$$

where $\hat{y}(k)$ represents the soft estimate of the symbol output by the equalizer, and $y(k)$ represents the known symbol value that was transmitted by transmitter 102.

According to a second example embodiment, the bias α of the equalizer output is used as a parameter for calculating SINR. One example formulation for bias is given by:

$$\hat{\alpha} = \text{Re}\left\{\sum_{k,\text{pilot\_symbols}} \frac{\hat{y}(k)}{y(k)}\right\} * \frac{1}{\text{Number\_of\_pilot\_symbols}}$$

With respect to both of these examples MSE and bias formulations, knowledge of the transmitted symbol values (i.e., the transmitted symbol value prior to corruption by wireless channel 110) is needed to calculate the parameter. Various example embodiments according to the present invention are described below for determining the transmitted symbol values for non-pilot portions of the frame, where these values are not known a priori at the receiver.

In operation 308, the one or more parameters calculated in operation 306 are used to estimate the SINR of wireless channel 110. The formulation used to estimate the SINR will depend upon the parameter(s) upon which the estimate is based. Furthermore, different formulations are possible using the same parameter(s). For example, the following formulation can be used to estimate the SINR of wireless channel 110 based on the MSE parameter:

$$S\hat{I}NR = \frac{\sigma_y^2}{M\hat{S}E - \sigma_y^2}$$

where $M\hat{S}E$ represents the MSE parameter calculated in operation 306, and $\sigma_y^2$ represents the average power of the transmitted constellation. As will be apparent, different formulations can be used to estimate the SINR. The principles described herein according to the present invention do not depend on any particular formulation of SINR. Rather, many formulations for estimating channel SINR based on parameters calculated during non-pilot portions of the frame are possible and contemplated within the scope of the present invention.

Furthermore, two or more parameters can be used in combination to improve the accuracy of the SINR estimate. For example, formulations including both the MSE and bias are contemplated within the scope of the invention that result in an improved SINR estimate.

The operations of FIG. 3 therefore describe a method for estimating the channel SINR, wherein the parameters used to calculate the SINR are not misestimated due to overfitting of the adaptive equalizer. This is accomplished by calculating the parameters during a non-pilot portion of the frame that is not used to adapt the equalizer. The improved channel SINR estimate can be used for a variety of purposes within receiver 104, such as setting an accurate data rate for transmissions over wireless channel 110. The following sections describe various techniques according to the present invention for applying the general operations of FIG. 3 to specific non-pilot portions of the frame, such as the control portion and the data portion.

Calculating Parameters Using Control Symbols

Figure 4:
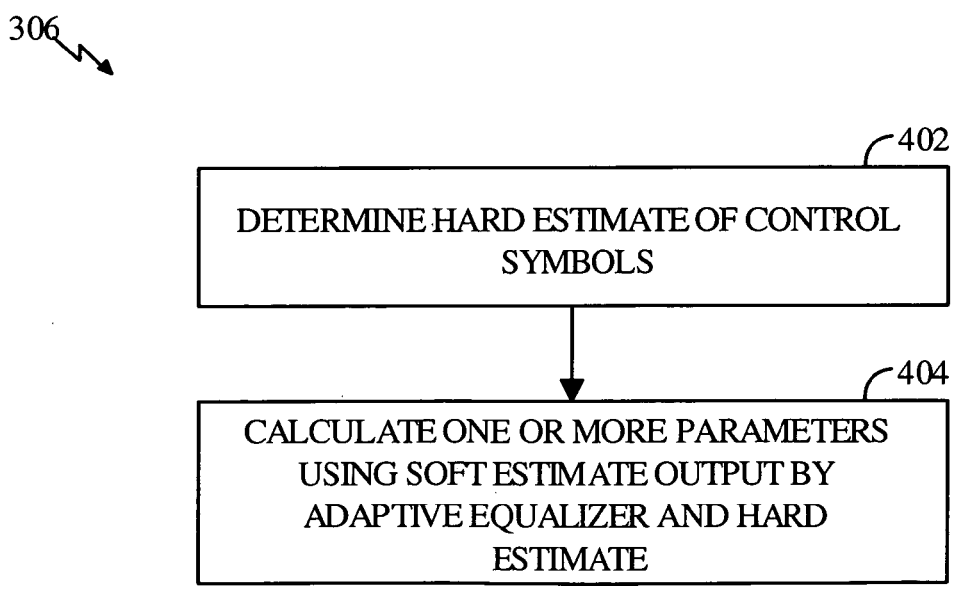
FIG. 4 is a flowchart that depicts determining one or more parameters using the output of adaptive equalizer in greater detail according to an example embodiment of the present invention, wherein an adaptive equalizer is applied to a control portion of a received frame.

FIG. 4 is a flowchart that depicts determining one or more parameters using the output of adaptive equalizer (operation 306) in greater detail according to an example embodiment of the present invention, wherein adaptive equalizer 108 is applied to control portion 204 of the received frame in operation 304.

In operation 402, a hard decision is applied to the output of adaptive equalizer 108 during control portion 204 to determine a hard estimate of the control symbols. The output of adaptive equalizer 108 during control portion 204 represents a soft estimate of the control symbols. The hard decision process is applied to these soft estimates to determine hard estimates. If the control symbol is detected correctly, the hard estimate will correspond to the symbol value at transmitter 102. CDMA systems are often designed such that control symbols can be determined at receiver 104 with a very small probability of error, even without coding the control data. In these systems, a simple hard decision process such as applying a threshold or quantizer can therefore be used to accurately detect the control symbols.

In operation 404, one or more parameters are calculated using the soft estimate of the control symbols output by adaptive equalizer 108 as well as the hard estimate of the symbols determined in operation 402. For example, the formulations given above for MSE or bias parameters can be calculated, wherein $\hat{y}(k)$ represents the soft estimate of the control symbols output by the equalizer. The hard estimate of the control symbols is used in place of the transmitted symbols $y(k)$ in the above formulations (the hard estimate will correspond to the transmitted symbols whenever a correct hard decision is made in operation 402). Returning to FIG. 3, these one or more parameters are then used in operation 308 to estimate the SINR of wireless channel 108. According to this example embodiment of the present invention, the channel SINR is less likely to be overestimated because the equalizer is less likely to be overfitted to control portion 204.

Calculating Parameters Using Re-Encoded Data Bits

Figure 5:
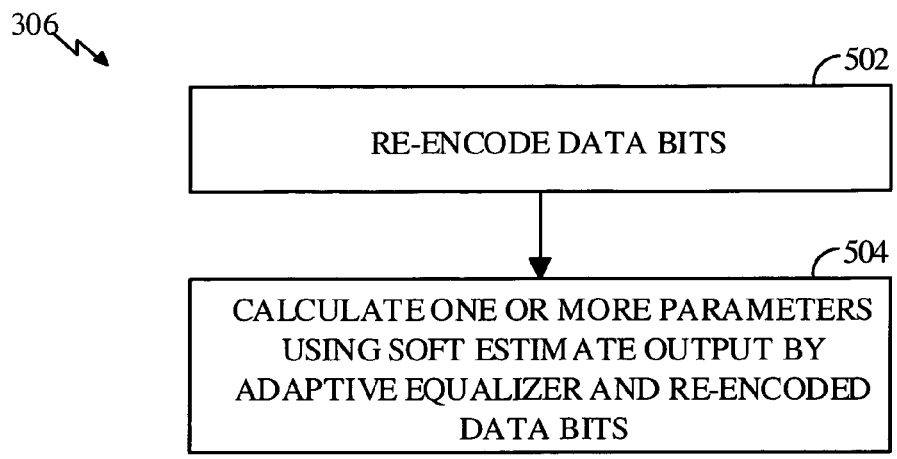
FIG. 5 is a flowchart that depicts determining one or more parameters using the output of adaptive equalizer in greater detail according to an example embodiment of the present invention, wherein an adaptive equalizer is applied to a data portion of a received frame.

FIG. 5 is a flowchart that depicts determining one or more parameters using the output of adaptive equalizer (operation 306) in greater detail according to an example embodiment of the present invention, wherein adaptive equalizer 108 is applied to data portion 206 of the received frame in operation 304. As shown in FIG. 1C, the output of adaptive equalizer 108 during the data portion (i.e., soft estimates of the encoded data symbols) is sent downstream to a demodulator/decoder to recover an estimate of the transmitted data bits. As mentioned above, a CRC can be used to ensure with a high degree of confidence that the data bits have been correctly demodulated and decoded.

In operation 502, the data bits output from the channel decoder are re-modulated and re-encoded according to the channel coding scheme. The CRC can be used as a check to ensure that the bits are correctly recovered prior to operation 502. The re-encoded data bits should therefore correspond to the transmitted symbol values corresponding to soft estimate at the output of adaptive equalizer 108 during data portion 206.

In operation 504, one or more parameters are calculated using the soft estimate of the data symbols output by adaptive equalizer 108 as well as the re-encoded data bits from operation 502. For example, the formulations given above for MSE or bias parameters can be calculated, wherein ŷ(k) represents the soft estimate of the data symbols output by the equalizer, and y(k) represents the re-encoded data bits. Returning to FIG. 3, these one or more parameters are then used in operation 308 to estimate the SINR of wireless channel 108. According to this example embodiment of the present invention, the channel SINR is less likely to be overestimated because the equalizer is less likely to be overfitted to data portion 206.

Improving the SINR Estimate by Smoothing a Compensation Factor

Figure 6:
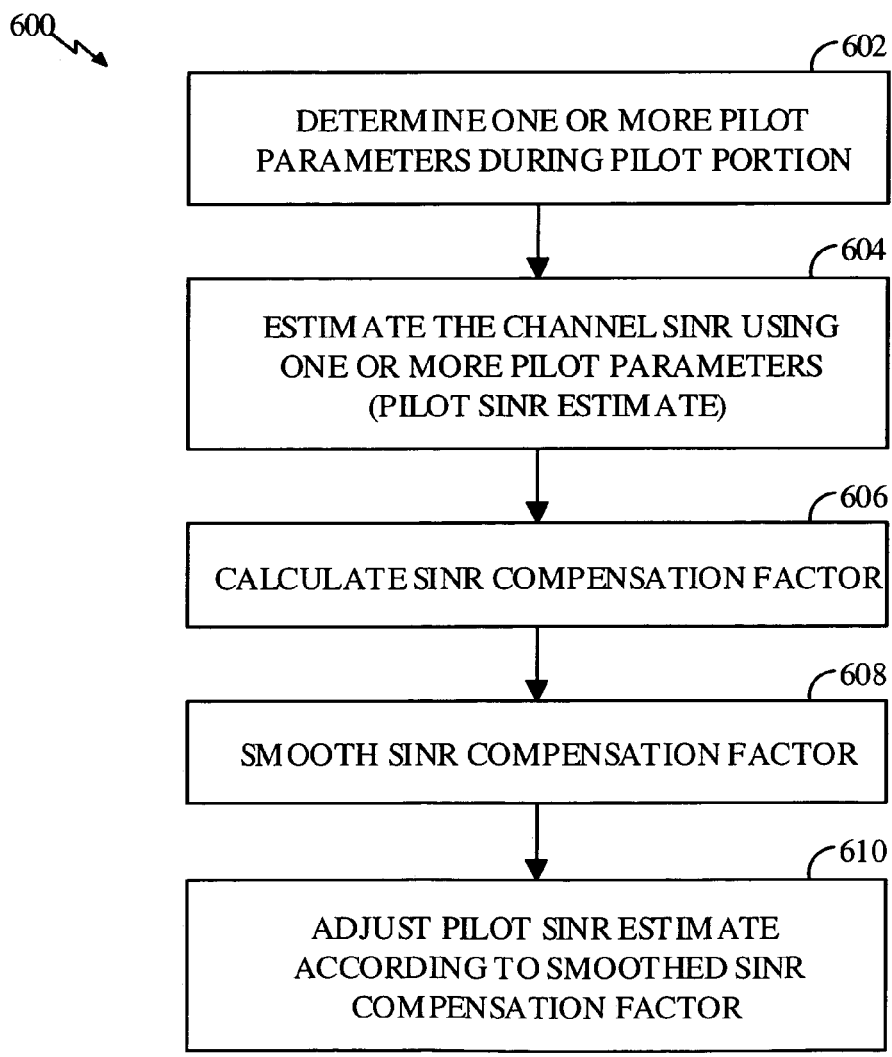
FIG. 6 is a flowchart that depicts operations that can be performed by a receiver to increase the accuracy of a channel SINR estimate.

FIG. 6 is a flowchart 600 that depicts operations that can be performed by receiver 104 in conjunction with the operations of FIGS. 3, 4, or 5, to increase the accuracy of the SINR estimate. In operation 602, one or more parameters are determined using the equalizer output during the adaptation process of operation 302. In operation 604, these one or more pilot parameters are used to estimate the channel SINR. As described above, this pilot SINR estimate will often overestimate the actual channel SINR due to overfitting of the equalizer to pilot portion 202.

In operation 606, a SINR compensation factor F is calculated that reflects the degree to which the pilot SINR estimate overstates the SINR of wireless channel 110 due to overfitting. The factor F can be calculated, for example, by dividing the pilot SINR by the non-pilot SINR estimate (determined in operation 308 based on parameters calculated during a non-pilot portion of the frame).

In operation 608, the SINR compensation factor F is smoothed (i.e., time averaged) over a plurality of frames, thereby yielding a more accurate estimate of F. In a first example formulation according to the present invention, the SINR compensation factor is calculated according to:

$$F(n) = \lambda F(n-1) + (1-\lambda)\frac{SINR\_Pilot[n]}{SINR\_NonPilot[n]}$$

where $\lambda$ is a real positive number less than one, SINR_Pilot is the pilot SINR estimate from operation 604, and SINR_NonPilot is the non-pilot SINR estimate from operation 308. In this example formulation, $\lambda$ effectively controls the window size over which the factor F is smoothed.

In a second example formulation according to the present invention, the SINR compensation factor is smoothed by computing the mean value over the last M observations according to:

$$F(n) = \frac{\sum_{m=1}^{M} F(n-m)}{M}$$

In operation 610, the pilot SINR estimate is adjusted according to the smoothed SINR compensation factor calculated in operation 608, yielding the compensated SINR estimate:

$$SINR\_compensated[n] = \frac{Pilot\_SINR[n]}{F[n]}$$

The compensated SINR estimate will on average reflect a more accurate estimate of the channel SINR than estimates based on parameters calculated in a single frame.

Calculating Parameters Using Previously Adapted Filter Coefficients

Figure 7:
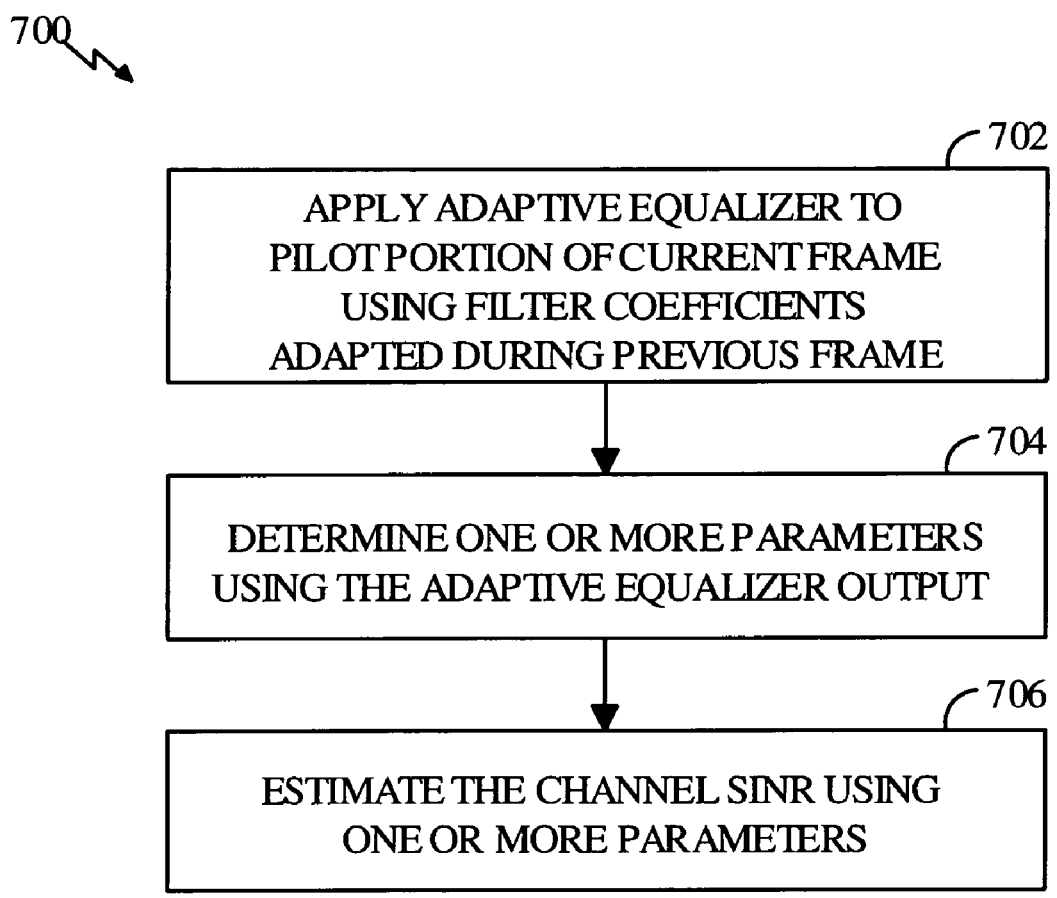
FIG. 7 is a flowchart that depicts the operations of a receiver according to an example embodiment of the present invention, wherein an adaptive equalizer is applied to a pilot portion using filter coefficients that were adapted during a previous frame.

FIG. 7 is a flowchart 700 that depicts the operations of receiver 104 according to an example embodiment of the present invention, wherein adaptive equalizer 108 is applied to pilot portion 202 using filter coefficients that were adapted during a previous frame.

In operation 702, adaptive equalizer 108 is applied to pilot portion 202 of the current frame, wherein the equalizer utilizes filter coefficients adapted during pilot portion 202 of a previous frame. This can be accomplished, for example, by applying adaptive equalizer 108 to pilot portion 202 upon receipt of the current frame, prior to adapting the equalizer to the current frame (operation 302), and using the filter coefficients already loaded in the equalizer from the previous frame.

In operation 704, as in operation 306, one or more parameters are determined using the output of adaptive equalizer 108 in operation 702. Similarly, in operation 706, as in operation 308, the SINR of wireless channel 110 is estimated using the one or more parameters calculated in operation 704. According to this example embodiment, adaptive equalizer 108 is less likely to be overfit to the current pilot portion because the filter coefficients were adapted during the previous pilot portion. As a result, the SINR estimate is less likely to be overstated.

Returning now to FIG. 1B, receiver 104 can be configured according to any of the example embodiments described above to generate a more accurate estimate of the SINR of wireless channel 110. Receiver 104 can use this improved SINR channel estimate to more accurately select an appropriate data rate for transmission over wireless channel 110.

In example mobile communication environment 100B, user terminal 122 sends a DRC message to base station 120 selecting a data rate based on this improved estimate. Employing the techniques described herein allows user terminal 122 to more accurately predict the error rate for a received frame given current channel conditions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for estimating a signal to interference-plus-noise ratio (SINR) of a wireless channel, wherein frames having a pilot portion and a non-pilot portion are transmitted over the wireless channel, said method comprising:
adapting an adaptive equalizer using the pilot portion of a frame, resulting in a pilot output;
applying said adaptive equalizer to the non-pilot portion of said frame, resulting in an output;
determining a parameter using said output, wherein said parameter comprises a first parameter;
estimating the SINR of the wireless channel using said parameter, resulting in a non-pilot SINR estimate;
determining a second parameter using said pilot output;
estimating the SINR of the wireless channel using said second parameter, resulting in a pilot SINR estimate;
calculating an SINR compensation factor using said non-pilot SINR estimate and said pilot SINR estimate;
smoothing said SINR compensation factor over a plurality of frames; and
adjusting said pilot SINR estimate according to said smoothed SINR compensation factor.

2. The method of claim 1, wherein said smoothing comprises:

$$F(n) = \lambda F(n-1) + (1-\lambda)\frac{PilotSINR}{NonpilotSINR}$$

wherein F represents said smoothed SINR compensation factor, and $\lambda$ represents a real positive number less than one.

3. The method of claim 1, wherein said smoothing comprises:

$$F(n) = \frac{\sum_{m=1}^{M} F(n-m)}{M}$$

wherein F represents said smoothed SINR compensation factor, and M represents the number of said plurality of frames.

4. An apparatus for estimating a signal to interference-plus-noise ratio (SINR) of a wireless channel, wherein frames having a pilot portion and a non-pilot portion are received via the wireless channel, said apparatus comprising:
an adaptive eciualizer that is adapted using the pilot portion of a frame, and applied to the non-pilot portion of said frame, resulting in an output;
means for determining a parameter using said output; and
means for estimating a SINR of the wireless channel using said parameter, wherein said non-pilot portion comprises a control portion having a plurality of control symbols, wherein the output of said adaptive equalizer during said control portion comprises a soft estimate of said control symbols, and said means for determining comprises:
means for applying a hard decision to said soft estimate, resulting in a hard estimate of said control symbols; and means for calculating said parameter using said soft estimate and said hard estimate.

5. The apparatus of claim 4, wherein said parameter comprises a mean squared error (MSE).

6. The apparatus of claim 4, wherein said parameter comprises a bias.

7. An apparatus for estimating a signal to interference-plus-noise ratio (SINR) of a wireless channel, wherein frames having a pilot portion and a non-pilot portion are received via the wireless channel, said apparatus comprising:
an adaptive eciualizer that is adapted using the pilot portion of a frame, and applied to the non-pilot portion of said frame, resulting in an output;
means for determining a parameter using said output; and
means for estimating a SINR of the wireless channel using said parameter, wherein said non-pilot portion comprises a data portion having a plurality of encoded data bits, wherein the output of said adaptive equalizer during said data portion comprises a soft estimate of said encoded data bits, wherein said apparatus further comprises a channel decoder configured to decode said soft estimate resulting in a plurality of decoded data bits, and wherein said means for determining comprises:
means for re-encoding said decoded data bits; and
means for calculating said parameter using said soft estimate and said re-encoded data bits.

8. The apparatus of claim 7, wherein said parameter comprises a mean squared error (MSE).

9. The apparatus of claim 7, wherein said parameter comprises a bias.

10. An apparatus for estimating a signal to interference-plus-noise ratio (SINR) of a wireless channel, wherein frames having a pilot portion and a non-pilot portion are received via the wireless channel, said apparatus comprising:
an adaptive equalizer that is adapted using the pilot portion of a frame, resulting in a pilot output, and applied to the non-pilot portion of said frame, resulting in an output;
means for determining a parameter using said output, wherein said parameter comprises a first parameter;
means for estimating a SINR of the wireless channel using said parameter, wherein said SINR estimate comprises a non-pilot SINR estimate;
means for determining a second parameter using said pilot output;
means for estimating the SINR of the wireless channel using said second parameter, resulting in a pilot SINR estimate;
means for calculating an SINR compensation factor using said non-pilot SINR estimate and said pilot SINR estimate;
means for smoothing said SINR compensation factor over a plurality of frames; and
means for adjusting said pilot SINR estimate according to said smoothed SINR compensation factor.

11. The apparatus of claim 10, wherein said means for smoothing is configured according to:

$$F(n) = \lambda F(n-1) + (1-\lambda)\frac{PilotSINR}{NonpilotSINR}$$

wherein F represents said smoothed SINR compensation factor, and λ represents a real positive number less than one.

12. The apparatus of claim 10, wherein said means for smoothing is configured according to:

$$F(n) = \frac{\sum_{m=1}^{M} F(n-m)}{M}$$

wherein F represents said smoothed SINR compensation factor, and M represents the number of said plurality of frames.

13. An apparatus for estimating a signal to interference-plus-noise ratio (SINR) of a wireless channel, wherein said apparatus comprises a receiver that receive frames via the wireless channel, said frames having a pilot portion and a non-pilot portion, wherein said receiver includes an adaptive equalizer that is adapted using said pilot portion and applied to said non-pilot portion resulting in an output, wherein said receiver is configured to determine a parameter using said output, and wherein said receiver is further configured to estimate the SINR of the wireless channel using said parameter wherein said non-pilot portion comprises a control portion having a plurality of control symbols, wherein the output of said adaptive equalizer during said control portion comprises a soft estimate of said control symbols, wherein said receiver is configured to apply a hard decision to said soft estimate, resulting in a hard estimate of said control symbols, and wherein said receiver is further configured to calculate said parameter using said soft estimate and said hard estimate.

14. The apparatus of claim 13, wherein said parameter comprises a mean squared error (MSE).

15. The apparatus of claim 13, wherein said parameter comprises a bias.

16. An apparatus for estimating a signal to interference-plus-noise ratio (SINR) of a wireless channel, wherein said apparatus comprises a receiver that receive frames via the wireless channel, said frames having a pilot portion and a non-pilot portion, wherein said receiver includes an adaptive equalizer that is adapted using said pilot portion and applied to said non-pilot portion resulting in an output, wherein said receiver is configured to determine a parameter using said output, wherein said receiver is further configured to estimate the SINR of the wireless channel using said parameter, wherein said non-pilot portion comprises a data portion having a plurality of encoded data bits, wherein the output of said adaptive equalizer during said data portion comprises a soft estimate of said encoded data bits, wherein said receiver further includes a channel decoder configured to decode said soft estimate resulting in a plurality of decoded data bits, wherein said receiver is configured to re-encode said decoded data bits, and wherein said receiver is further configured to calculate said parameter using said soft estimate and said re-encoded data bits.

17. The apparatus of claim 16, wherein said parameter comprises a mean squared error (MSE).

18. The apparatus of claim 16, wherein said parameter comprises a bias.

* * * * *